United States Patent Office 3,267,050
Patented August 16, 1966

3,267,050
FOAMED ORGANIC POLYISOCYANATE-AMINE REACTION PRODUCTS
William C. Kuryla, St. Albans, Donald G. Leis, Charleston, and Albert Douglas Winquist, Jr., St. Albans, W. Va., assignors to Union Carbide Corporation, a corporation of New York
No Drawing. Filed May 21, 1962, Ser. No. 196,495
4 Claims. (Cl. 260—2.5)

The invention relates to a new class of organic polyisocyanate-amine reaction products. In one aspect, the invention relates to the polymeric products obtained by reacting organic polyisocyanates with a certain class of amines, which are fully described hereinbelow. In another aspect, the invention relates to modified polyurethanes which are obtained by reacting organic polyisocyanates with an admixture of polyol and one or more amines of the class mentioned above.

It is known that various reactive hydrogen containing compounds react with organic polyisocyanates to form useful surface coatings, elastomers, foamed reaction products, and the like. A major point of novelty of the present invention resides in the use of a certain class of amines as coreactants with organic polyisocyanates to produce polymeric products having the above utility. The amines employed in the invention are those which can be represented by Formula I I 

wherein R represents the residue of an organic alcohol which has $n$ alcoholic hydroxyl groups, and wherein $n$ represents an integer having a value of at least 1 and up to 8 or more. By "residue of an organic alcohol" is meant that moiety which remains after removal of the hydrogen atoms of the alcoholic hydroxyl groups of the alcohol.

The amines employed in the invention can be prepared by cyanoethylation of an alcohol of the formula $R(H)_n$, wherein R and $n$ have the meaning stated in Formula I supra, followed by the reduction of the cyanoethylated product to the corresponding amine. This method of production can be illustrated by the following equations:

(a) 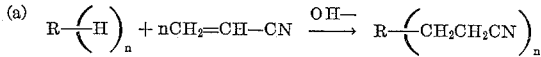

In this reaction, the alcohol is reacted with acrylonitrile in the presence of a basic catalyst.

(b) 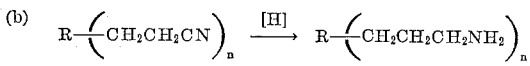

After neutralizing the basic catalyst, the cyanoethylated product is hydrogenated. The hydrogenation is carried out in conventional equipment in the presence of, for example, a nickel on kieselguhr catalyst. It is also desirable to conduct the hydrogenation in the presence of a small amount (for example, 10 weight percent, based on weight of reaction mixture) of anhydrous ammonia and pyridine. The hydrogenation can be carried out at, for example, 110–130° C. and 950–2000 p.s.i.g. pressure. At these conditions, the reaction takes from about 4 minutes to 3 to 4 hours.

From the above discussion, it is seen that the amines employed in the invention have the molecular structure of the starting alcohol with the hydrogen atoms of the alcoholic hydroxyl groups of said alcohol being replaced with 3-aminopropyl groups. Among the alcohols which can be employed to produce the amines employed in the invention are the following classes of compounds:

(a) Alkanols and alkylene oxide adducts thereof,
(b) Polyhydroxyalkanes and alkylene oxide adducts thereof,
(c) Trialkanolamines and alkylene oxide adducts thereof,
(d) Polyols derived from mono- and polyamines by addition of alkylene oxides,
(e) Non-reducing sugars and sugar derivatives and alkylene oxide adducts thereof,
(f) Mono- and polyphenols and alkylene oxide adducts thereof, and the like.

Among the alkanols which can be employed are, for example, methanol, ethanol, isopropanol, n-propanol, the butanols, the pentanols, the hexanols, the heptanols, 2-ethylhexanol and other octanols, the nonanols, the decanols, and the like. The alkylene oxide (i.e., vicinal epoxyalkane) adducts of the alkanols can also be employed, particularly the ethylene oxide, 1,2-epoxypropane, the epoxybutane, and mixtures thereof, adducts of said alkanols. It is pointed out that when an alkanol is employed, R in Formula I supra is an alkoxy group, and when an alkylene oxide adduct is employed, R is an alkoxy-end blocked oxyalkylene group (as used throughout the subject specification and claims, "oxyalkylene" is intended to include both "monoxyalkylene" and "polyoxyalkylene").

Illustrative polyhydroxyalkanes which can be employed include, for example, ethylene glycol, propylene glycol, 1,3-dihydroxybutane, 1,4-dihydroxybutane, 1,6-dihydroxyhexane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, sorbitol, and the like. The alkylene oxide adducts of the above-exemplified and other polyhydroxyalkanes can also be employed, preferably, wherein the oxyalkylene moieties have from 2 to 4 carbon atoms. When the alcohol employed is a polyhydroxyalkane, R in Formula I supra is a group of the formula $C_rH_{(2r+2-n)}(O)_n$ wherein $r$ represents the number of carbon atoms in the group, for example a number having a value of from 2 to 10 or more, and wherein $n$ has the meaning stated in Formula I supra that is, the number of hydroxyl groups in the starting alcohol, which is usually from 2 to 6). When an alkylene oxide adduct of a polyhydroxyalkane is employed, R in Formula I supra is a group of the formula

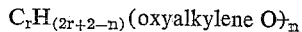

wherein the variables $r$ and $n$ have the meaning stated above.

One preferred class of alkylene oxide adducts of polyhydroxyalkanes are the polyoxyalkylene glycols, for example, diethylene glycol, triethylene glycol, tetraethylene glycol, high molecular weight polyethylene glycols, dipropylene glycol, tripropylene glycol, tetrapropylene glycol, high molecular weight polypropylene glycols, dibutylene glycol, mixed ethylene and propylene glycols, mixed polyethylene and polypropylene glycols, and the like. R in Formula I supra is oxypolyoxyalkylene when a polyoxyalkylene glycol is employed as the starting alcohol.

The trialkanolamines contemplated include, among others, triethanolamine, triisopropanolamine, the tributanolamines, and the like, wherein the alkanol moieties preferably have from 2 to 4 carbon atoms. Also, the alkylene oxide adducts of the trialkanolamines can be employed, preferably the ethylene oxide, 1,2-epoxypropane, the epoxybutane and mixtures thereof, adducts of said trialkanolamines. When a trialkanolamine is employed as the starting alcohol in the preparation of the amines which are used in the invention, R in Formula I supra is a group of the formula N(monoxyalkylene)$_3$, and when an alkylene oxide adduct of a trialkanolamine is employed, R is a group of the formula

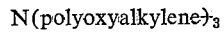
N(polyoxyalkylene)$_3$

Another useful class of alcohols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetraamine, 1,3-butanediamine, 1,3-propanediamine, 1,4-butanediamine, 1,6-hexanediamine, phenylenediamines, toluenediamines, naphthalenediamines, and the like. Among the compounds of the above groups which are of particular interest are, among others, N,N,N',N'-tetrakis(2-hydroxyethyl)ethylenediamine, N,N,N',N'-tetrakis(2-hydroxypropyl)ethylenediamine, N,N,N',N'',N''-pentakis(2-hydroxypropyl)diethylenetriamine, phenyldiisopropanolamine and higher alkylene oxide adducts of aniline, and the like. When an alkylene oxide adduct of an amine is employed as the starting alcohol, R in Formula I supra is a hydrocarbonaminooxyalkylene group, the hydrocarbon moieties being free of acetylenic and ethylenic unsatuartion.

A further class of alcohols which can be employed as the starting alcohol in the preparation of the amines which are used in the invention are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glycoside, and the like. When a non-reducing sugar or sugar derivative is employed as the starting alcohol, R in Formula I supra is the sugar residue, and when an alkylene oxide adduct thereof is employed, R is sugar residue-terminated oxyalkylene.

A still further useful class of alcohols are the mono- and polyphenols, and preferably the alkylene oxide adducts thereof wherein the alkylene oxides have from 2 to 4 carbon atoms. Among the mono- and polyphenols which are contemplated are found, for example, phenol, and cresols and other alkylphenols, 2,2-bis(para-hydroxyphenyl)propane, bis(para-hydroxyphenyl)methane, condensation products of phenol and formaldehyde, more particularly the novolac resins, condensation products of various phenolic compounds and acrolein, the simplest members of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenyl)ethanes, and the like. When a mono- or polyphenol is employed as the starting alcohol in the preparation of the amines which are used in the invention, R in Formula I supra is an aryloxy group (this term includes "monoaryloxy" and "polyaryloxy"), and when an alkylene oxide adduct of a mono- or polyphenol is used, R is an aryloxy end-blocked oxyalkylene group.

From the above-exemplified list of alcohols, it is seen that a great many alcohols can be employed as the starter in the preparation of the amines used in the invention. Although virtually any alcohol can be used, it is in general preferred to employ polyhydric alcohols having from 2 to about 8 or more alcoholic hydroxyl groups. It is also desirable that the alcohol be substantially free of ethylenic and acetylenic unsaturation and also that the alcohol be free of non-hydrocarbon moities other than tertiary amino nitrogen, ether oxygen, and alcoholic hydroxyl. Where the alcohol employed is a high molecular weight alcohol, for example an alkylene oxide adduct of an amine or monomeric alcohol, it is preferred that the molecular weight of the alcohol be less than about 10,000, preferably less than about 6000, and more preferably less than about 3500. The most preferred alcohols are the polyalkylene glycols and the alkylene oxide adducts of polyhydroxyalkanes wherein the oxyalkylene moieties thereof have from 2 to 4 carbon atoms.

In preparing the polymeric products of the invention, one or more of the amines described above is reacted with an organic polyisocyanate. The organic polyisocyanates which are employed to prepare the compositions of the invention include, for example, 2,4- and 2,6-tolylene diisocyanate, durylene diisocyanate, bis(4-isocyanatophenyl)methane, 4,4',4''-tris(isocyanatophenyl)methane, hexamethylene diisocyanate, xylylene diisocyanates, 3,10-diisocyanatotricyclo[5.2.1.0$^{2,6}$]decane, and polyisocyanates listed in the publication of Siefken, Annalen 562, pages 122–135 (1949). Further polyisocyanates of particular interest are those obtained by reacting aromatic amines with formaldehyde and phosgenation of the resulting condensation products as set forth in U.S. Patents 2,683,730 and 3,012,008. The preferred organic polyisocyanates are the tolylene diisocyanates.

It is also within the scope of the invention to use polyisocyanate dimers, trimers, or polymers of the above-mentioned polyisocyanates. Such products can be prepared separately by procedures known in the art or they can be formed in situ during the polymerization reaction of the polyisocyanate with the amine by proper choice of catalysts known to catalyze dimerization, trimerization, or polymerization, such as potassium laurate.

It is in general preferred to employ one or more of the above-described amines in an admixture with one or more polyols, and to react the said admixture with an organic polyisocyanate to form a modified polyurethane elastomer, foam, surface coating, or the like. Among the polyols which can be employed for this purpose are, for example, one or more polyols from the following classes of compositions:

(a) Polyhydroxylalkanes and alkylene oxide adducts thereof,
(b) Trialkanolamines and alkylene oxide adducts thereof,
(c) Polyols derived from mono- and polyamines by addition of alkylene oxides,
(d) Alkylene oxide adducts of polyphenols,
(e) Alkylene oxide adducts of non-reducing sugars and sugar derivatives, and the like.

The above-identified class of polyols (a) through (e) were described and illustrated hereinabove under the discussion of the starter alcohols for the preparation of the amines which are represented by Formula I supra. The preferred polyols are the polyoxyalkylene glycols and other alkylene oxide adducts of polyhydroxyalkanes. The exact polyol employed depends upon the end-use of the modified polyurethane product. For example, in the case of foamed reaction products, the molecular weight or the hydroxyl number is selected properly to result in flexible, semi-flexible, or rigid foams. The above polyols preferably possess a hydroxyl number of from about 200 to about 1000 when employed in rigid foam formulations, from about 50 to about 150 for semi-flexible foam formulations, and from about 40 to about 70 or more when employed in flexible foam formulations. Such limits are not intended to be restrictive, but are merely illustrative of the large number of possible combinations of the above polyol coreactants.

The hydroxyl number of the polyol, as used herein, is defined by the equation $$OH = \frac{f \times 1000 \times 56.1}{M.W.}$$

OH=hydroxyl number
$f$=functionality (that is, average number of alcoholic hydroxyl groups per molecule)
$M.W.$=molecular weight of the polyol Hydroxyl number is normally determined by acetylating one gram of the polyol, and thereafter determining the number of milligrams of KOH required to completely hydrolyze the acetylated derivative. The hydroxyl number is equal to the said number of milligrams.

The amount of amine employed in conjunction with the polyol can vary widely. Ordinarily, the amine is employed in an amount of not more than about 70 weight percent of the amine-polyol admixture, preferably not more than about 50 weight percent of the amine-polyol admixture, and more preferably not more than about 30 weight percent of the amine-polyol admixture, down to, for example, 1 weight percent or less of the amine-polyol admixture.

The amount of organic polyisocyanate employed is dependent, in part, upon such factors as the nature of the reactants, the nature of the end-use for the modified polyurethane product, and the like. In general, however, the total isocyanate equivalent to total reactive hydrogen equivalent (i.e., total equivalent of alcoholic hydroxyl, amino hydrogen, plus water, if water is employed in the formulation) is ordinarily such as to provide enough isocyanate equivalents to react with all reactive hydrogen equivalents present. Preferably, the ratio of isocyanate equivalents to reactive hydrogen equivalents is about 1.0 to 1.1 —NCO equivalents per reactive hydrogen equivalent.

When preparing surface coatings either the quasiprepolymer technique or the prepolymer technique is ordinarily employed. When preparing elastomers, the quasiprepolymer technique is preferred, and when preparing foamed products, either the quasiprepolymer technique or the one-shot technique can be employed. These techniques are known in the art.

Foaming can be accomplished by employing a small amount of water in the reaction mixture (for example, from about 0.5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about $-40°$ C. and 70° C., and which vaporize at or below the temperature of the foaming mass. These blowing agents include, for example, trichloromonofluoromethane, dichlorodifluoromethane, dicholormonofluoromethane, dichloromethane, trichloromethane, bromotrifluoromethane, chlorodifluoromethane, chloromethane, 1,1 - dichloro-1-fluoromethane, 1,1-difluoro-1,2,2-trichloroethane, chloropentafluoroethane, 1-chloro-1-fluoroethane, 1-chloro-2-floroethane, 1,1-difluoro-1,2,2-trichloroethane, chloro-1,1,1,2,3,3,4,4,4 - nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example;

(a) Tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-dimethylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen-isocyanate reaction or as a secondary catalyst in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

It is also within the scope of the invention to employ small amounts, e.g., about 0.001 percent to 5.0 percent by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influencee the type of foam structure that is formed, the foam products of the invention can be prepared without emulsifiers.

One especially desirable feature of the invention is the fact that a small amount (e.g., from 1–15 weight percent of the amine-polyol admixture) of an amine as represented by Formula I supra when used in an otherwise conventional polyurethane foam formulation, significantly increases the strength of the resulting foamed product.

The polymeric compositions of the invention are useful in the production of surface coatings, elastomers, foams, and the like. The foams, for example, are useful as cushions, furniture padding, automotive crash pads, in sandwich panels, and the like. The elastomers are useful, for example, in preparing molded and shaped articles.

The examples which follow illustrate various aspects of the invention.

EXAMPLE 1

A prepolymer was prepared by reacting 100 parts by weight of dry polypropylene glycol having a molecular weight of about 2025 and 40 parts by weight of bis(4-isocyanatophenyl)methane for 0.5 hour at 135° C. and 1–2 millimeters of mercury pressure. At the end of the reaction period, the temperature was reduced to 100° C., and 4.5 grams of 1,4-butanediol and 100 grams of Amine A[1] were stirred into the liquid mixture. The liquid mixture was cast into pans and test molds and cured for 20 hours at 110° C. The resulting elastomer had a Shore A-2 hardness at 0 second of 25–30.

[1] Amine A was prepared by cyanoethylation and hydrogenation of polypropylene glycol having a molecular weight of about 2025. Thus, Amine A has the formula $$R(CH_2CH_2CH_2NH_2)_2$$

wherein R is an oxypolyoxypropylene group having a molecular weight of about 2025.

EXAMPLES 2–6

By procedures analogous to that described in Example 1, elastomers were prepared from the formulations set forth in Table I, wherein the relative proportions of the components are by weight. Representative properties of the elastomers are also set forth in Table I.

*Table I.—Formulation and properties of elastomers*

| Example No. | 2 | 3 | 4 | 5 | 6 |
|---|---|---|---|---|---|
| Components: | | | | | |
| Polypropylene glycol (m.w.=2025) | 100 | 100 | 100 | 100 | 50 |
| Amine A | 200 | 10 | 20 | 30 | 50 |
| 1,4-butanediol | | 8.5 | 8.1 | 7.7 | 9.0 |
| Bis(4-isocyanatophenyl)methane | 40 | 40 | 40 | 40 | |
| Tolylene diisocyanate | | | | | 27.8 |
| Physical Properties: | | | | | |
| 300% Modulus, p.s.i. | | 810 | 600 | 600 | |
| Tensile Strength, p.s.i. | | 2,350 | 970 | 1,400 | |
| Elongation, percent | | 685 | 450 | 485 | |
| Hardness, Shore A-2 | | | | | |
| At 0 sec | 20–30 | 69 | 62 | 62 | 46 |
| At 15 sec | | 67 | 58 | 58 | 45 |

EXAMPLES 7–35

A series of foamed reaction products were prepared by the one-shot technique in a commercial foaming machine. The foaming was as follows:

Machine—Mobay Type UB-52
Through-put—15 pounds/minute
Mixer Speed—5,000 r.p.m.
Post Cure—15 minutes at 250° F.
Premix Temperature—70–80° F.

| Feed Stream to Mixing Head of Foam Machine | Component | Parts by weight |
|---|---|---|
| 1 | Polyol [1] | 100. |
| 2 | Stannous octoate | Varied. |
| | N-methylmorpholine | 0.2. |
| | Polyol [1] | 2.0. |
| 3 | Water | 3.5. |
| | TMBDA [2] | 0.1. |
| | Silicone L-520 [3] | 1 2. |
| 4 | Tolylene diisocyanate | 3% excess. |

[1] The polyol employed was a mixture of amine and a polyoxypropylene triol derived by addition of propylene oxide to glycerol, said triol having a hydroxyl number of 56. The compositions of the various mixtures of triols and amines are shown in Table II below, and are defined in terms of weight percent amine in the mixture.
[2] N,N,N',N'-tetramethyl-1,3-butanediamine.
[3] Silicone L-520 is a polysiloxane polyoxyethyleneoxypropylene block copolymer.

Table II below, indicates the concentration of amine in the polyol, the various tin catalyst concentrations employed, and representative properties of the foams.

The amines employed were:

Amine A—described supra in Example 1;
Amine B—prepared by cyanoethylation and hydrogenation of polypropylene glycol of about 1000 molecular weight;
Amine C—prepared by cyanoethylation and hydrogenation of the 1,2-exopypropane adduct of glycerol having a hydroxyl number of about 58.

The evaluation tests were the standard density, tensile, elongation, tear resistance, and ILD tests. In the ILD test, a 13 inch by 13 inch foam specimen of the indicated thickness is compressed, the indicated percent of the original thickness under a circular metal plate having an area of 50 square inches. The results are given in pounds. For example, in the 2" ILD 25% test, a 2 inch thick specimen is compressed to 1.5 inches by a load of the indicated number of pounds.

Table II, which follows, displays the foam formulations and representative properties of the foams.

Table II
FOAM FORMULATIONS AND PROPERTIES

| | Amine B | | | | | | | | | Amine A | | | | | | | | |
|---|---|---|---|---|---|---|---|---|---|---|---|---|---|---|---|---|---|---|
| Amine Concentration, in polyol | 2.5% | | | 5% | | | | 10% | | 2.5% | | | 5% | | | 10% | | |
| Example No | 7 | 8 | 9 | 10 | 11 | 12 | 13 | 14 | 15 | 16 | 17 | 18 | 19 | 20 | 21 | 22 | 23 | 24 |
| Tin Catalyst Conc., p.h.r | 0.20 | 0.30 | 0.40 | 0.15 | 0.20 | 0.30 | 0.35 | 0.15 | 0.20 | 0.20 | 0.30 | 0.40 | 0.20 | 0.30 | 0.35 | 0.20 | 0.25 | 0.30 |
| Cream Time, sec | 8 | 8 | 7 | 7 | 7 | 6 | 7 | 7 | 5 | 8 | 7 | 5 | 8 | 9 | 7 | 6 | 6 | 5 |
| Rise Time, sec | 89 | 77 | 70 | 84 | 72 | 62 | 73 | 97 | 80 | 90 | 70 | 74 | 90 | 84 | 74 | 75 | 72 | 66 |
| Density, lbs./ft.$^3$ | 1.72 | 1.65 | 1.55 | 1.90 | 1.83 | 1.62 | 1.71 | 1.87 | 1.78 | 1.79 | 1.77 | 1.72 | 1.79 | 1.77 | 1.74 | 1.82 | 1.86 | 1.74 |
| Tensile, lbs./in.$^2$ | 15.9 | 18.2 | 17.5 | 17.8 | 19.6 | 20.3 | 20.0 | 20.8 | 21.7 | 14.9 | 19.5 | 19.3 | 17.4 | 21.7 | 21.6 | 18.9 | 19.3 | 19.4 |
| Elongation, Percent | 213 | 223 | 229 | 239 | 295 | 248 | 351 | 261 | 255 | 181 | 260 | 282 | 240 | 294 | 325 | 221 | 228 | 246 |
| Tear Resist., lbs./in.$^2$ | 2.2 | 1.79 | 1.98 | 2.43 | 2.49 | 2.18 | 2.98 | 2.73 | 3.62 | 2.02 | 2.65 | 2.76 | 2.93 | 3.35 | 3.17 | 2.89 | 2.82 | 2.52 |
| 2″ ILD, pounds: | | | | | | | | | | | | | | | | | | |
| 25% | 24.3 | 28.8 | 26.7 | 20.9 | 24.9 | 26.6 | 24.0 | 22.2 | 25.9 | 20.1 | 27.7 | 27.9 | 19.2 | 22.2 | 24.0 | 27.0 | 25.8 | 28.8 |
| 50% | 32.6 | 36.4 | 25.0 | 29.0 | 33.9 | 35.0 | 32.3 | 32.4 | 35.6 | 29.7 | 36.5 | 36.7 | 27.2 | 29.6 | 31.8 | 37.0 | 35.8 | 38.2 |
| 65% | 45.8 | 50.1 | 48.5 | 41.4 | 47.5 | 48.0 | 44.9 | 46.4 | 50.8 | 43.2 | 50.6 | 51.0 | 40.0 | 41.9 | 44.6 | 52.0 | 50.2 | 52.6 |
| 4″ ILD, pounds: | | | | | | | | | | | | | | | | | | |
| 25% | 32.0 | 37.2 | 37.1 | 29.9 | 33.4 | 39.2 | 31.0 | 30.5 | 35.0 | 27.4 | 38.0 | 36.2 | 26.0 | 30.9 | 33.0 | 35.7 | 36.0 | 40.6 |
| 50% | 45.8 | 52.5 | 50.7 | 47.1 | 49.4 | 56.2 | 44.9 | 45.3 | 51.6 | 42.3 | 54.5 | 51.9 | 40.0 | 45.2 | 47.8 | 51.0 | 52.4 | 50.8 |
| 65% | 61.5 | 68.0 | 65.8 | 65.3 | 65.4 | 72.5 | 58.9 | 61.9 | 68.6 | 59.0 | 71.9 | 68.2 | 55.5 | 59.3 | 62.5 | 67.9 | 70.2 | 75.9 |

| | Amine C | | | | | | | | | Control | |
|---|---|---|---|---|---|---|---|---|---|---|---|
| Amine Concentration in polyol | 2.5% | | | 5% | | | 10% | | | No Amine | |
| Example No | 25 | 26 | 27 | 28 | 29 | 30 | 31 | 32 | 33 | 34 | 35 |
| Tin Catalyst Conc., p.h.r | 0.20 | 0.30 | 0.35 | 0.20 | 0.30 | 0.35 | 0.15 | 0.20 | 0.30 | 0.25 | 0.4 |
| Cream Time, sec | 7 | | 4 | 9 | 7 | 7 | 7 | 6 | 5 | 9 | 7 |
| Rise Time, sec | 83 | | 60 | 91 | 77 | 73 | 87 | 77 | 60 | 88 | 70 |
| Density, lbs./ft.$^3$ | 1.73 | 1.72 | 1.61 | 1.73 | 1.72 | 1.73 | 1.83 | 1.75 | 1.61 | 1.75 | 1.73 |
| Tensile, lbs./in.$^2$ | 17.7 | 19.9 | 17.4 | 18.3 | 18.3 | 19.3 | 16.8 | 17.6 | 18.7 | 17.8 | 19.9 |
| Elongation, Percent | 222 | 247 | 212 | 266 | 286 | 329 | 210 | 194 | 228 | 272 | 336 |
| Tear Resist., lbs./in.$^2$ | 2.25 | 2.66 | 2.74 | 2.50 | 3.03 | 2.95 | 2.24 | 2.22 | 2.61 | 2.53 | 3.06 |
| 2″ ILD, pounds: | | | | | | | | | | | |
| 25% | 24.8 | 21.8 | 26.0 | 22.0 | 24.4 | 24.5 | 21.2 | 27.1 | 28.0 | 20.8 | 22.0 |
| 50% | 33.1 | 30.0 | 34.0 | 28.7 | 32.0 | 32.4 | 29.7 | 36.0 | 36.0 | 28.9 | 29.4 |
| 65% | 46.8 | 39.4 | 47.0 | 40.0 | 45.4 | 45.4 | 42.1 | 50.7 | 50.0 | 41.0 | 41.5 |
| 4″ ILD, pounds: | | | | | | | | | | | |
| 25% | 30.8 | 35.6 | 34.2 | 29.0 | 32.4 | 35.8 | 31.6 | 34.7 | 34.4 | 28.4 | 34.1 |
| 50% | 43.8 | 50.6 | 48.7 | 41.5 | 45.0 | 49.0 | 47.6 | 51.5 | 48.8 | 41.0 | 47.0 |
| 65% | 58.4 | 66.9 | 64.6 | 55.0 | 58.8 | 64.8 | 63.9 | 63.6 | 62.9 | 55.0 | 62.5 |

What is claimed is:

1. A foam which comprises the foamed reaction product of an organic polyisocyanate, blowing agent, catalyst, and an admixture of (a) a polyol having a hydroxyl number of from about 40 to about 1000, and (b) from 1 to 15 weight percent, based on weight of polyol plus amine, of an amine of the formula

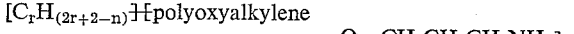

wherein $r$ represents an integer having a value of from 2 to 10 wherein $n$ represents a number having a value of from 2 to 6, and wherein the oxyalkylene moieties have from 2 to 4 carbon atoms.

2. A foam which comprises the foamed reaction product of an organic polyisocyanate, blowing agent, catalyst, and an admixture of (a) a polyol having a hydroxyl number of from about 40 to about 1000, and (b) from 1 to 15 weight percent, based on weight of polyol plus amine, of an amine of the formula

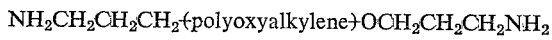

wherein the oxalkylene moieties have from 2 to 4 carbon atoms.

3. The composition of claim 1 wherein said organic polyisocyanate is tolylene diisocyanate and wherein the said oxyalkylene moieties are oxypropylene.

4. The composition of claim 2 wherein said organic polyisocyanate is tolylene diisocyanate and wherein said oxyalkylene moieties are oxypropylene.

References Cited by the Examiner
UNITED STATES PATENTS

| | | | |
|---|---|---|---|
| 2,625,532 | 1/1953 | Seeger | 260—75 |
| 3,044,989 | 7/1962 | Shivers | 260—77.5 |
| 3,058,955 | 10/1962 | Neumann et al. | 260—75 |
| 3,075,927 | 1/1963 | Lanham | 260—2.5 |
| 3,179,606 | 4/1965 | Prescott et al. | 260—2.5 |

LEON J. BERCOVITZ, *Primary Examiner.*

WILLIAM H. SHORT, *Examiner.*

D. E. CZAJA, *Assistant Examiner.*